(12) United States Patent
Wu

(10) Patent No.: US 8,593,041 B1
(45) Date of Patent: Nov. 26, 2013

(54) BACKLIGHT MODULE AND HEATSINK APPARATUS

(75) Inventor: Zexin Wu, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/583,221

(22) PCT Filed: Aug. 31, 2012

(86) PCT No.: PCT/CN2012/080840
§ 371 (c)(1),
(2), (4) Date: Sep. 7, 2012

(30) Foreign Application Priority Data

Aug. 28, 2012 (CN) .......................... 2012 1 0310371

(51) Int. Cl.
*H01J 1/02* (2006.01)
(52) U.S. Cl.
USPC ............................................ 313/46; 362/294

(58) Field of Classification Search
USPC ............................................ 313/46; 362/294
See application file for complete search history.

(56) References Cited

U.S. PATENT DOCUMENTS 6,198,222 B1 * 3/2001 Chang ........................... 313/582
2005/0157500 A1 * 7/2005 Chen et al. .................... 362/294

* cited by examiner

*Primary Examiner* — Mary Ellen Bowman
(74) *Attorney, Agent, or Firm* — Andrew C. Chang

(57) ABSTRACT

The present invention discloses a heatsink apparatus for use with a backlight module. The heatsink apparatus is used to dissipate heat buildup from a light source, and includes a heatsink and a backframe. The heatsink is thermally in contact with the light source. The backframe and the heatsink jointly define a ventilation shaft on a surface of the backframe. The present invention further includes a backlight module incorporated with the heatsink. With the provision of the ventilation shaft of the heatsink, the performance of the heat dissipation is increased, and the service life of the light source is therefore prolonged.

14 Claims, 2 Drawing Sheets ically, a light emitting diode (LED) is used for generating light needed by the panel, and the LED has been treated as a vital part of the backlight module. Currently, a light bar or light strip on which a plurality of LEDs are arranged in an array on a printed circuit board. The LEDs are powered by the printed circuit board and therefore create a line-light. The line-light is then transformed into a surface-light through a waveguide. Nevertheless, the LEDs will generate a great deal of heat during operation, and accordingly, a heat dissipating device or heatsink apparatus is required.

BACKLIGHT MODULE AND HEATSINK APPARATUS

FIELD OF THE INVENTION

The present invention relates to a technology of heat dissipation for a display, and more particularly, to a heatsink, and a backlight module incorporated with the heatsink.

DESCRIPTION OF PRIOR ART

A typical liquid crystal display device generally is configured with a backlight module on which a liquid crystal display panel is installed. Since the liquid display panel does not emit light, the panel has to be illuminated by a light source from the backlight module. Typically, a light emitting diode (LED) is used for generating light needed by the panel, and the LED has been treated as a vital part of the backlight module. Currently, a light bar or light strip on which a plurality of LEDs are arranged in an array on a printed circuit board. The LEDs are powered by the printed circuit board and therefore create a line-light. The line-light is then transformed into a surface-light through a waveguide. Nevertheless, the LEDs will generate a great deal of heat during operation, and accordingly, a heat dissipating device or heatsink apparatus is required.

Referring to FIG. 1, which is an illustration and cross sectional view of a prior art heatsink device. As shown in FIG. 1, the heatsink device 100 generally includes a light source 110, a heatsink 120, and a backframe 130.

The light source 110 is in contact with the heatsink 120, which conducts heat buildup from the light source 110 to the backframe 130, which then dissipates the heat. However, the heat dissipating performance is poor.

SUMMARY OF THE INVENTION

The present invention provides a backlight module and a heatsink apparatus to be used with the backlight module. The heatsink apparatus can readily resolve the poor heat dissipating performance encountered by the existing prior art.

In order to resolve the technical issue encountered by the prior art, the present invention provides a technical solution by introducing a heatsink for backlight module for dissipating heat buildup generated by a light source. The heatsink apparatus includes a heatsink configured with an inner plate and an external plate spaced apart with the inner plate, and a backframe defines a window. Wherein the inner plate is arranged at an inner side of the backframe, and the external plate extending through the window, both ends of the external plate being interconnected with the inner plate, wherein a central portion of the external plate is distant to the inner plate.

In order to resolve the technical issue encountered by the prior art, the present invention provides a technical solution by introducing a heatsink apparatus for use with a backlight module, wherein the heatsink is used to dissipate a heat buildup generated by a light source, and includes a heatsink and a backframe, wherein the backframe and the heatsink construct a ventilation shaft projecting beyond a surface of the backframe.

According to a preferred embodiment of the present invention, wherein the ventilation shaft has a hollowed and enclosed rectangular shape or bow-shaped with ends in communication with atmosphere.

According to a preferred embodiment of the present invention, wherein the heatsink is made from aluminum material or electro-galvanized steel plate.

According to a preferred embodiment of the present invention, wherein the heatsink is configured with an inner plate and an external plate spaced apart with the inner plate, and a backframe having a window, wherein the inner plate is arranged at an inner side of the backframe, and the external plate extending through the window, both ends of the external plate being interconnected with the inner plate, wherein a central portion of the external plate is distant to the inner plate.

According to a preferred embodiment of the present invention, wherein the window is defined at a central portion of the backframe.

According to a preferred embodiment of the present invention, wherein the external plate has a slot or curve configuration, and is integral with the inner plate.

According to a preferred embodiment of the present invention, wherein the backframe is defined with an external chamber and the heatsink encloses an opening of the external chamber so as to constructs the ventilation shaft projected over a surface of the backframe.

According to a preferred embodiment of the present invention, wherein the external chamber has a slot or curve configuration.

In order to resolve the technical issue encountered by the prior art, the present invention provides a technical solution by introducing a backlight module incorporated with a heatsink apparatus for dissipating heat buildup generated from a light source, and including a heatsink and a backframe, wherein the backframe and the heatsink construct a ventilation shaft projecting beyond a surface of the backframe.

The present invention can be concluded with the following advantages: as compared to the existing technology, the backlight module and the heatsink apparatus incorporated in the backlight module adopt a ventilation shaft so as to upgrade the heat dissipation performance. As a result, the service life of the light source is prolonged.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein.

Figure 1:
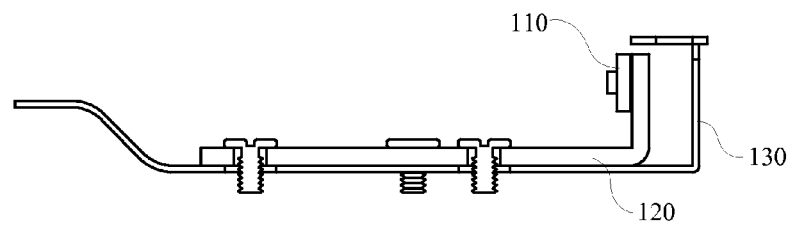
FIG. 1 is an illustration and cross sectional view of a prior art backlight module in which a heatsink is arranged.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Figure 2:
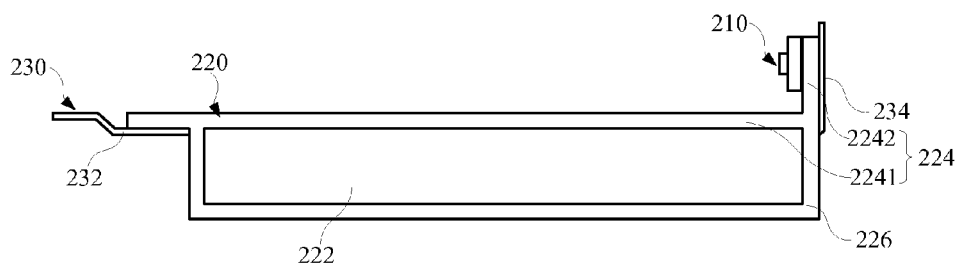
FIG. 2 is an illustrational and cross sectional view of a heatsink apparatus made in accordance with a first embodiment of the present invention.

Referring to FIG. 2, which is an illustrational and cross sectional view of a heatsink apparatus made in accordance with a first embodiment of the present invention.

As shown in FIG. 2, a heatsink apparatus 200 for use with a backlight module is provided, and the heatsink apparatus 200 is used to dissipate heat buildup from a light source 210. The heatsink apparatus 200 includes a heatsink 220 and a backframe 230.

The light source 210 is thermally in contact with the heatsink 220, and the backframe 230 is defined with a window (not labeled). The heatsink 220 is defined with a ventilation shaft 222 projecting through the window. Accordingly, heat buildup of the light source 210 during its working cycle can be effectively dissipated by the heatsink 220.

Substantially, the light source 210 is generally made-up with a LED strip. The backframe 230 includes a backboard 232 and a skirt 234 perpendicular to the backboard 232. The backboard 232 is defined with the window. The window has a comparably larger dimension and located adjacent to the skirt 232.

The heatsink 220 can be made from aluminum material or electro-galvanized steel plate. It can be integrally formed. The heatsink 220 includes an inner plate 224 and an external plate 226. The inner plate 224 is disposed inside of the backframe 230 such that the window is sealed. As shown in FIG. 2, the inner plate 224 has an L-shaped configuration, and includes a mainboard 2241 which seals the window, and an installation tab 2242 perpendicular to the mainboard 2241. The light source 210 is disposed onto the installation tab 2242. The external plate 226 projects over the window, and ends of the external plate 226 are interconnected with the inner plate 224. A middle portion of the external plate 226 and the inner plate 224 jointly define a ventilation shaft 222 which is in communication with atmosphere with its both ends (as viewed from a direction perpendicular to the drawing Figure). This ventilation shaft 222 projects beyond a surface of the backframe 230. Accordingly, the heat dissipation performance of the heatsink 200 is tremendously increased.

As shown in FIG. 2, the ventilation shaft 222 has a rectangular cross section. However, the invention should not be limited thereto. In other embodiment, the ventilation shaft 222 can be a bow configuration. i.e. the inner plate 224 remained the same, while the external plate 226 has a curve-shaped cross section. With the arrangement, heat can again be readily dissipated.

Figure 3:
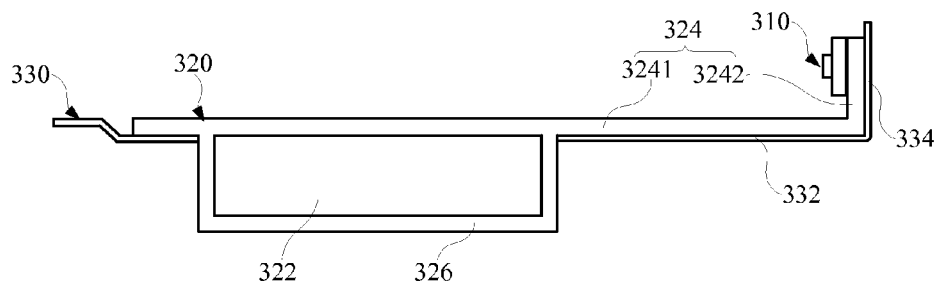
FIG. 3 is an illustrational and cross sectional view of a heatsink apparatus made in accordance with a second embodiment of the present invention.

Referring to FIG. 3, which is an illustrational and cross sectional view of a heatsink apparatus made in accordance with a second embodiment of the present invention.

Referring to FIG. 3, according to a second embodiment of the present invention, a heatsink apparatus 300 for use with a backlight module is provided. The heatsink apparatus 300 is used to dissipate heat buildup from a light source 310. The heatsink apparatus 300 includes a heatsink 320 and a backframe 330.

The light source 310 is thermally in contact with the heatsink 320, and the backframe 330 is defined with a window (not labeled). The heatsink 320 is defined with a ventilation shaft 322 projecting through the window. Accordingly, heat buildup of the light source 310 during its working cycle can be effectively dissipated by the heatsink 320.

Substantially, the light source 310 is generally made-up with a LED strip. The backframe 330 includes a backboard 332 and a skirt 334 perpendicular to the backboard 332. The backboard 332 is defined with the window. The window is located at a central portion of the backboard 232 so as to avoid the peripheral of the backboard 332. By this arrangement, a thickness of the backframe 330 along an edge will not be affected.

The heatsink 320 can be made from aluminum material or electro-galvanized steel plate. It can be integrally formed. The heatsink 320 includes an inner plate 324 and an external plate 326. The inner plate 324 is disposed inside of the backframe 330 such that the window is sealed. As shown in FIG. 2, the inner plate 224 has an L-shaped configuration, and includes a mainboard 3241 which seals the window, and an installation tab 3242 perpendicular to the mainboard 3241. The light source 310 is disposed onto the installation tab 3242. The external plate 326 projects over the window, and ends of the external plate 326 are interconnected with the inner plate 324. A middle portion of the external plate 326 and the inner plate 324 jointly define a ventilation shaft 322, which is in communication with atmosphere with its both ends (as viewed from a direction perpendicular to the drawing Figure). This ventilation shaft 322 projects beyond a surface of the backframe 330. Accordingly, the heat dissipation performance of the heatsink 300 is tremendously increased.

As shown in FIG. 3, the ventilation shaft 322 has a rectangular cross section. However, the invention should not be limited thereto. In other embodiment, the ventilation shaft 322 can be a bow configuration, i.e. the inner plate 324 remained the same, while the external plate 326 has a curve-shaped cross section. With the arrangement, heat can again be readily dissipated.

Figure 4:
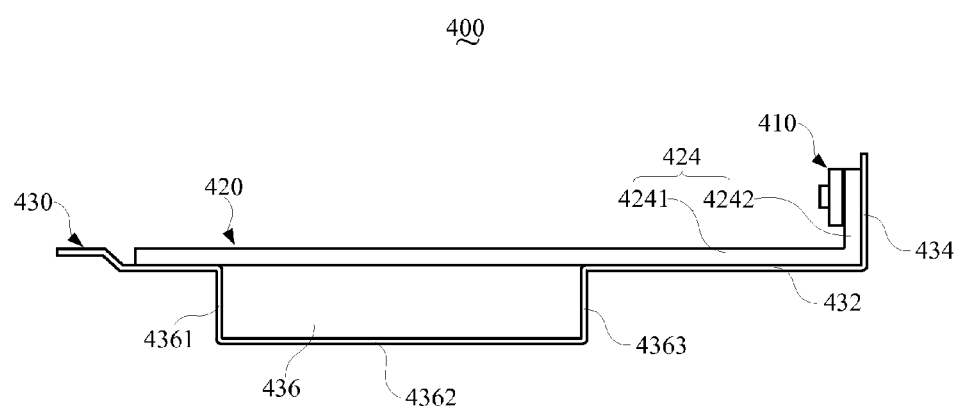
FIG. 4 is an illustrational and cross sectional view of a heatsink apparatus made in accordance with a third embodiment of the present invention.

Referring to FIG. 4, which is an illustrational and cross sectional view of a heatsink apparatus made in accordance with a third embodiment of the present invention.

Referring to FIG. 4, according to a second embodiment of the present invention, a heatsink apparatus 400 for use with a backlight module is provided. The heatsink apparatus 400 is used to dissipate heat buildup from a light source 410. The heatsink apparatus 400 includes a heatsink 420 and a backframe 430.

The light source 410 is thermally in contact with the heatsink 420. The backframe 430 includes a backboard 432 and a skirt 434 perpendicular to the backboard 432. Furthermore, the backboard 432 is defined with an external chamber 436 by stamping. The external chamber 436 is preferably located at a central portion of the backboard 432. By this arrangement, a thickness of the backframe 330 along an edge will not be affected.

The external chamber 436 is configured with a first board 4321, a second board 4322, and a third board 4323 jointly interconnected together. Ends of the external chamber 436 are in communication with atmosphere (viewed from a direction perpendicular to the drawing Figure). The external chamber 436 can be readily created by general stamping process. The heatsink 420 seals the external chamber 436 in a location within the backframe 430 so as to create a ventilation shaft project beyond a surface of the backframe 430. The ventilation shaft is an enclosed shaft only with ends are in communication with the atmosphere. By this arrangement, the performance of the heatsink 400 is tremendously increased.

As shown in FIG. 4, the ventilation shaft has a rectangular cross section. However, the invention should not be limited thereto. In other embodiment, the ventilation shaft can be a bow configuration. i.e. the inner plate remained the same, while the external plate has a curve-shaped cross section. With the arrangement, heat can again be readily dissipated.

The present invention further provides a backlight module in which a heatsink apparatus described above has been incorporated.

In conclusion, it can be readily appreciated by the skilled in the art that as compared to the existing technology, the backlight module and the heatsink apparatus incorporated in the backlight module adopt a ventilation shaft so as to upgrade the heat dissipation performance. As a result, the service life of the light source is prolonged.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A heatsink for backlight module for dissipating heat buildup generated by a light source, and including a heatsink configured with an inner plate and an external plate spaced apart with the inner plate, and a backframe having a window, wherein the inner plate is arranged at an inner side of the backframe, and the external plate extending through the window, both ends of the external plate being interconnected with the inner plate, wherein a central portion of the external plate is distant to the inner plate.

2. A heatsink apparatus for use with a backlight module, wherein the heatsink is used to dissipate a heat buildup generated by a light source, and includes a heatsink and a backframe, wherein the backframe and the heatsink construct a ventilation shaft projecting beyond a surface of the backframe;
    wherein the heatsink is made from aluminum material or electro-galvanized steel plate; and
    wherein the heatsink is configured with an inner plate and an external plate spaced apart with the inner plate, and a backframe having a window, wherein the inner plate is arranged at an inner side of the backframe, and the external plate extending through the window, both ends of the external plate being interconnected with the inner plate, wherein a central portion of the external plate is distant to the inner plate.

3. The heatsink apparatus as recited in claim 2, wherein the ventilation shaft has a hollowed and enclosed rectangular shape or bow-shaped with ends in communication with atmosphere.

4. The heatsink apparatus as recited in claim 2, wherein the window is defined at a central portion of the backframe.

5. The heatsink apparatus as recited in claim 2, wherein the external plate has a slot or curve configuration, and is integral with the inner plate.

6. The heatsink apparatus as recited in claim 2, wherein the backframe is defined with an external chamber and the heatsink encloses an opening of the external chamber so as to construct the ventilation shaft projected over a surface of the backframe.

7. The heatsink apparatus as recited in claim 6, wherein the external chamber has a slot or curve configuration.

8. A backlight module incorporated with a heatsink apparatus for dissipating heat buildup generated from a light source, and including a heatsink and a backframe, wherein the backframe and the heatsink construct a ventilation shaft projecting beyond a surface of the backframe;
    wherein the heatsink is made from aluminum material or electro-galvanized steel plate;
    wherein the heatsink is configured with an inner plate and an external plate spaced apart with the inner plate, and a backframe having a window, wherein the inner plate is arranged at an inner side of the backframe, and the external plate extending through the window, both ends of the external plate being interconnected with the inner plate, wherein a central portion of the external plate is distant to the inner plate.

9. The backlight module as recited in claim 8, wherein the ventilation shaft has a hollowed and enclosed rectangular shape with ends in communication with atmosphere.

10. The backlight module as recited in claim 8, wherein the ventilation shaft has a hollowed and enclosed rectangular shape or bow-shaped with ends in communication with atmosphere.

11. The backlight module as recited in claim 8, wherein the window is defined at a central portion of the backframe.

12. The backlight module as recited in claim 8, wherein the outside plate has a slot or curve configuration and is integrally formed with the inner plate.

13. The backlight module as recited in claim 8, wherein the backframe is defined with an external chamber and the heatsink encloses an opening of the external chamber so as to construct the ventilation shaft projected over a surface of the backframe.

14. The backlight as recited in claim 13, wherein the external chamber has a slot or curve configuration.

* * * * *